(12) United States Patent
Tompane et al.

(10) Patent No.: US 11,801,990 B2
(45) Date of Patent: *Oct. 31, 2023

(54) METHODS OF USING MODIFIED SHIPPING CONTAINERS

(71) Applicants: Kyle Tompane, San Diego, CA (US); Garrett Moore, Coronado, CA (US)

(72) Inventors: Kyle Tompane, San Diego, CA (US); Garrett Moore, Coronado, CA (US)

(73) Assignee: Agorus, Inc.

(*) Notice: Subject to any disclaimer, the term of this patent is extended or adjusted under 35 U.S.C. 154(b) by 0 days.

This patent is subject to a terminal disclaimer.

(21) Appl. No.: 18/116,756

(22) Filed: Mar. 2, 2023

(65) Prior Publication Data
US 2023/0202747 A1 Jun. 29, 2023

Related U.S. Application Data

(63) Continuation of application No. 17/752,804, filed on May 24, 2022, now Pat. No. 11,603,260, which is a continuation-in-part of application No. 17/394,720, filed on Aug. 5, 2021, and a continuation-in-part of application No. 17/394,737, filed on Aug. 5, 2021.

(51) Int. Cl.
*B65D 88/12* (2006.01)
*B65D 90/00* (2006.01)
*B65G 65/30* (2006.01)
*E04B 2/70* (2006.01)

(52) U.S. Cl.
CPC ......... *B65D 88/121* (2013.01); *B65D 88/125* (2013.01); *B65D 90/004* (2013.01); *B65G 65/30* (2013.01); *E04B 2/70* (2013.01)

(58) Field of Classification Search
CPC ........ B65D 88/121; B65D 88/125; E04B 2/70
See application file for complete search history.

(56) References Cited

U.S. PATENT DOCUMENTS

| | | | | |
|---|---|---|---|---|
| 3,044,653 A | * | 7/1962 | Tantlinger | B65D 88/125 296/100.18 |
| 3,082,492 A | * | 3/1963 | Grubb | B27F 1/00 403/381 |
| 3,414,124 A | * | 12/1968 | Lidgard | B65D 85/48 206/386 |

(Continued)

*Primary Examiner* — Jonathan Snelting
(74) *Attorney, Agent, or Firm* — James A. Italia; Italia IP

(57) ABSTRACT

Methods and apparatuses for shipping of fabricated rectangular wooden modules used for construction of a wood frame structure and for shipping of other bulky items are described. In particular, the disclosure features a modified shipping container for shipping the fabricated rectangular wooden modules and methods of loading, transporting, and unloading the fabricated rectangular wooden modules. The modified shipping container features a removable header system and a removable cover. The fabricated rectangular wooden modules include a module length axis, a module width axis, a bounded wood perimeter, and joists or rafters oriented perpendicularly to the module length axis, and are stacked as cargo in the interior of the container such that joists or rafters of the fabricated rectangular wooden modules are substantially vertical and the length axes of the modules are substantially parallel to a length axis of the container.

12 Claims, 15 Drawing Sheets

(56) References Cited

U.S. PATENT DOCUMENTS

| | | | | |
|---|---|---|---|---|
| 3,985,231 | A * | 10/1976 | Farhat | B65D 85/48 |
| | | | | 206/451 |
| 6,260,323 | B1 * | 7/2001 | Hockey | E04B 2/74 |
| | | | | 52/537 |
| 6,474,720 | B1 * | 11/2002 | Fliege | B65D 88/125 |
| | | | | 296/186.2 |
| 8,403,142 | B2 * | 3/2013 | Rose | B65D 85/48 |
| | | | | 206/448 |
| 11,603,260 | B2 * | 3/2023 | Tompane | B65D 88/125 |
| 2017/0081115 | A1 * | 3/2017 | Hopkins | B65D 88/123 |

\* cited by examiner

METHODS OF USING MODIFIED SHIPPING CONTAINERS

CROSS-REFERENCE TO RELATED APPLICATIONS

The present application is a continuation application of U.S. Non-Provisional patent application Ser. No. 17/752,804 filed on May 24, 2022, which was a continuation-in-part of U.S. Non-Provisional patent application Ser. Nos. 17/394,720 and 17/394,737, both of which were filed on Aug. 5, 2021, each of said applications are hereby incorporated by reference in their entireties.

FIELD

The present disclosure is directed to the field of intermodal shipping. More particularly, the disclosure relates to methods and apparatuses for the shipping of fabricated rectangular wooden modules and other bulky items.

BACKGROUND

Shipping containers come in standard sizes and are capable of transport by sea, rail, or road all over the world. Standard dimensions of shipping containers (length by width by height) include 10 feet by 8 feet by 8 feet 6 inches, 20 feet by 8 feet by 8 feet 6 inches, 20 feet by 8 feet by 9 feet 6 inches, 40 feet by 8 feet by 8 feet 6 inches, 40 feet by 8 feet by 9 feet 6 inches, and 45 feet by 8 feet by 9 feet 6 inches. The containers are unloaded from cargo ships at ports by a crane, and then placed on trucks or trains for transport inland. However, the design of the shipping containers often hinders transport of cargo that is bulky and/or has dimensions exceeding structurally defined dimensions of the containers, thus limiting their use.

SUMMARY

In general, in a first aspect, the disclosure features a modified shipping container. The modified shipping container includes a container bottom, two container sides and a container end in communication with the container bottom, a first container opening opposing the container end providing access to a container interior from a front of the container, one or more doors at the first container opening configured to facilitate front loading of the container when open, and seal the first container opening when closed, and a second container opening providing access to the container interior from the top of the container.

In general, in a second aspect, the disclosure features a removable header system for a shipping container. The removable header system includes a header having a header bore therethrough, a frame having a structure extending outward from the frame and capable of supporting the header, a flange attached to a support, the flange having a flange bore therethrough and in alignment with the header bore, a pin designed to pass through the header bore and flange bore, and a clip designed to attach at an end of the pin on a side of the header opposing the flange which locks the pin in place when the header is attached to the shipping container. The removable header system can further include a tether attached to the pin at one end and attached to the support at an opposing end.

In general, in a third aspect, the disclosure features a removable cover for a shipping container. The removable cover includes a rectangular piece of flexible polymeric material dimensioned to cover the top of the shipping container, the flexible polymeric material including a portion which extends over a top portion of one or more sides of the shipping container during use, a strip or margin of material attached to the portion of polymeric material, and a plurality of rings attached to the strip or margin of fabric.

In general, in a fourth aspect, the disclosure features a method of loading one or more fabricated rectangular wooden modules into a modified shipping container. Each fabricated rectangular wooden module includes a module length axis, a module width axis, a bounded wood perimeter, and joists or rafters oriented perpendicularly to the module length axis. The method includes placing the one or more fabricated rectangular wooden modules in the interior of the modified shipping container such that joists or rafters of the fabricated rectangular wooden modules are substantially vertical and the length axes of the modules are substantially parallel to a length axis of the container.

In general, in a fifth aspect, the disclosure features a method of unloading one or more fabricated rectangular wooden modules into a modified shipping container. Each fabricated rectangular wooden module includes a module length axis, a module width axis, a bounded wood perimeter, and joists or rafters oriented perpendicularly to the module length axis. The method includes removing the one or more fabricated rectangular wooden modules from the interior of the modified shipping container, the fabricated rectangular wooden modules having been previously loaded such that they are oriented within an interior of the modified shipping container such that joists or rafters of the fabricated rectangular wooden modules are substantially vertical and the length axes of the modules are substantially parallel to a length axis of the container.

In general, in a sixth aspect, the disclosure features a method of transporting one or more fabricated rectangular wooden modules by way of a modified shipping container. Each fabricated rectangular wooden module includes a module length axis, a module width axis, a bounded wood perimeter, and joists or rafters oriented perpendicularly to the module length axis. The method includes loading the one or more fabricated rectangular wooden modules in an interior of the modified shipping container such that joists or rafters of the fabricated rectangular wooden modules are substantially vertical and the length axes of the modules are substantially parallel to a length axis of the container, shipping the one or more fabricated rectangular wooden modules in the modified shipping container by way of an intermodal transport system including road, rail, and/or sea transport, and unloading the one or more fabricated rectangular wooden modules from the interior of the modified shipping container.

Features of implementations of the modified shipping container, removable header system, removable cover, and methods of loading, unloading, or transporting can include the following. The modified shipping container can include a removable header at a top of the first container opening spanning at least a portion of an interior width of the container. The removable header can be configured to be joined to a frame at the first container opening. The frame can include a first support structure extending outward from the frame which supports the removable header during attachment or removal of the removable header. The removable header can include a header bore designed to receive a pin capable of locking the removable header in place when attached. The modified shipping container can include a flange attached to a second support structure, the flange having a flange bore in alignment with the header bore. The modified shipping container can include a pin passing through the header bore and flange bore, and a clip at an end of the pin disposed on a side of the removable header opposing the flange which locks the pin in place when the removable header is attached. The modified shipping container can include a removable cover disposed above and sealing the second container opening, an outer margin or strip of material attached to the removable cover, a plurality of rings attached to the outer margin or strip of fabric, and/or a rope passing through the plurality of rings. The modified shipping container can include a plurality of hooks disposed at an outer surface of the container sides, the container end, and the one or more container doors. The rope can be woven taut through the plurality of rings and plurality of hooks to cover a portion of the removable cover extending over the two container sides, the container end, and the one or more container doors, thereby securing the removable cover. Each of the plurality rings can be disposed above and between each of the plurality of hooks such that the rope is woven taut in a zig-zag pattern. The removable cover can be made of a flexible polymeric material. The first container opening and second container opening of the modified shipping container together can provide for a continuous space spanning through both the front and the top of the container when the header and cover are both removed. The container sides, container end, and one or more container doors can be designed to collapse in a flattened state. The interior of the container can be empty or can have one or more cargo chosen from fabricated rectangular wooden modules including floor modules, ceiling modules, roof modules, and wall modules. Each fabricated rectangular wooden module can include a module length axis, a module width axis, a bounded wood perimeter, and joists or rafters oriented perpendicularly to the module length axis, and the fabricated rectangular wooden modules can be stacked in the interior of the container such that joists or rafters of the fabricated rectangular wooden modules are substantially vertical and the length axes of the modules are substantially parallel to a length axis of the container. The method of loading can include removing a removable header from the modified shipping container prior to placing the one or more fabricated rectangular wooden modules in the interior of the modified shipping container. The one or more fabricated wooden modules can be placed in the interior of the modified shipping container through a front opening of the modified shipping container. The method of loading can include replacing the removable header after the one or more fabricated rectangular wooden modules are placed in the interior of the modified shipping container interior. The removable header can be a component of a system installed on the modified shipping container. The system can include a frame having a structure extending outward from the frame and capable of supporting the header, a flange attached to a support, the flange having a flange bore therethrough and in alignment with a header bore, a pin designed to pass through the header bore and the flange bore, and a clip designed to attach at an end of the pin on a side of the header opposing the flange which locks the pin in place when the header is attached to the modified shipping container. The method of loading can include removing a removable cover from the modified shipping container prior to placing the one or more fabricated rectangular wooden modules in the interior of the modified shipping container. The one or more fabricated wooden modules can be placed in the interior of the modified shipping container through a top opening of the modified shipping container. The method of loading can include replacing the removable cover after the one or more fabricated rectangular wooden modules are placed in the interior of the modified shipping container interior. The removable cover can be made of a rectangular piece of flexible polymeric material dimensioned to cover the top of the modified shipping container, the flexible polymeric material including a portion which extends over a top portion of one or more sides of the shipping container during use, a strip or margin of material attached to the portion of polymeric material, and a plurality of rings attached to the strip or margin of material. The method of unloading can include removing a removable header from the modified shipping container prior to removing the one or more fabricated rectangular wooden modules from the interior of the modified shipping container. The one or more fabricated wooden modules can be removed from the interior of the modified shipping container through a front opening of the modified shipping container. The removable header can be a component of a system installed on the modified shipping container. The system can include a frame having a structure extending outward from the frame and capable of supporting the header, a flange attached to a support, the flange having a flange bore therethrough and in alignment with a header bore, a pin designed to pass through the header bore and the flange bore, and a clip designed to attach at an end of the pin on a side of the header opposing the flange which locks the pin in place when the header is attached to the modified shipping container. The method of unloading can include removing a removable cover from the modified shipping container prior to removing the one or more fabricated rectangular wooden modules from the interior of the modified shipping container. The one or more fabricated wooden modules can be removed from the interior of the modified shipping container through a top opening of the modified shipping container. The removable cover can include a rectangular piece of flexible polymeric material dimensioned to cover the top of the shipping container, the flexible polymeric material including a portion which extends over a top portion of one or more sides of the shipping container during use, a strip or margin of material attached to the portion of polymeric material, and a plurality of rings attached to the strip or margin of fabric. The method of transporting can include loading the container by removing a removable header and introducing the one or more fabricated rectangular wooden modules through a front opening of the container, and/or removing a removable cover and introducing the one or more fabricated rectangular wooden modules through a top opening of the container. The method of transporting can include unloading the container by removing a removable header and removing the one or more fabricated rectangular wooden modules through a front opening of the container, and/or removing a removable cover and removing the one or more fabricated rectangular wooden modules through a top opening of the container. The modified shipping container can be dimensioned in standard shipping container exterior dimensions allowing for intermodal transport, the dimensions including a length chosen from 10, 20, 40, and 45 feet, a width of 8 feet, and a height chosen from 8½ feet and 9½ feet.

It should be understood that the above features of the modified shipping container, removable header system, removable cover, and methods of loading, unloading, or transporting are not to be considered limitations on the invention defined by the claims. The featured modified shipping container, removable header system, removable cover, and methods can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

FIG. 6B is an image showing a magnified view of the removable header system. FIG. 6C is a diagram showing a side view of the removable header system and FIG. 6D is a diagram showing a top view of the removable header system.

FIGS. 7-11 are images providing a view of an outside portion of a door or doors of a modified shipping container which show a portion of a cover of the modified container and features for securing the cover. FIGS. 12 and 13 are images which also show such features at a back end (FIG. 12) and side (FIG. 13) of the modified shipping container.

DETAILED DESCRIPTION

Reference will now be made in detail to various illustrative implementations. It is to be understood that the following discussion of the implementations is not intended to be limiting.

Figure 1:
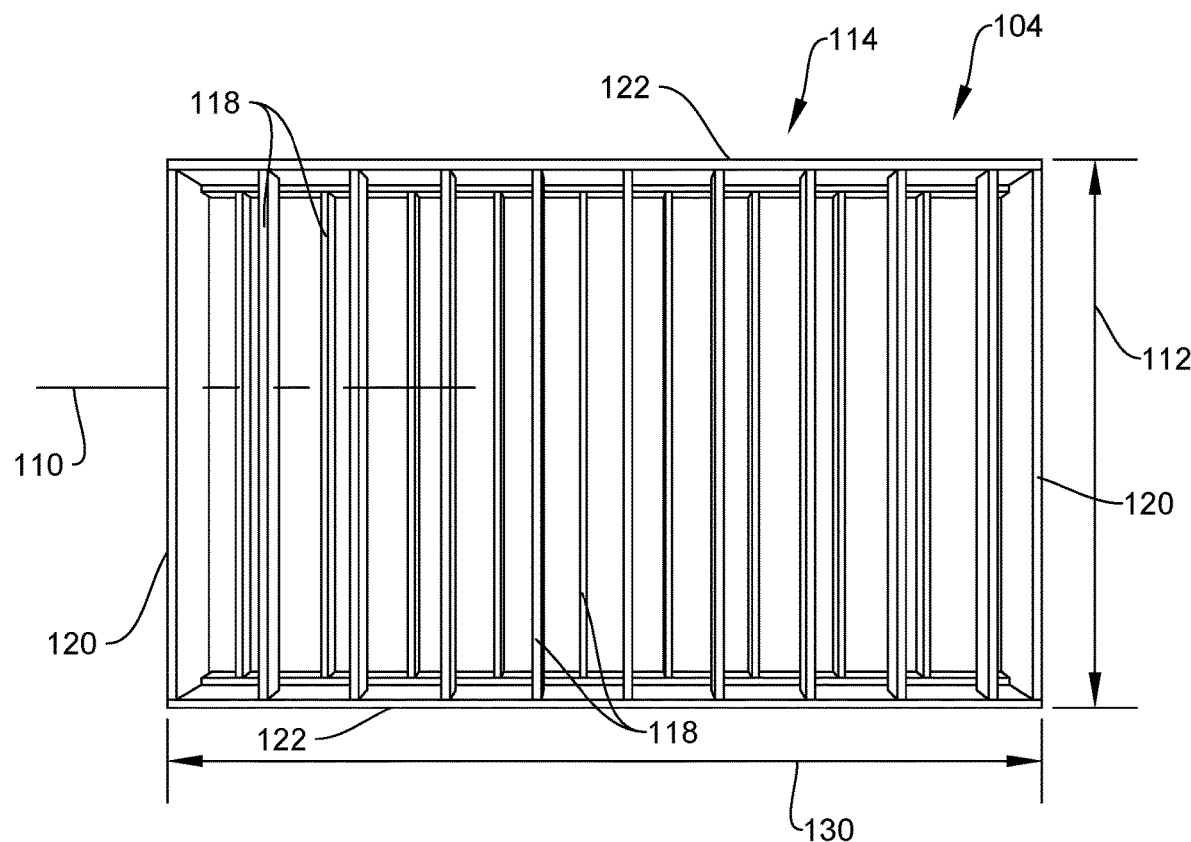
FIG. 1 is a diagram providing a plan view of a generic fabricated rectangular wooden module used for construction of a wood frame building structure that can be transported by modified shipping containers and methods described herein. The module can be used for constructing a portion of the wood frame building such as a wall, a floor, a ceiling, or a roof.

FIG. 1 shows an expeditiously fabricated wooden module 104 that can be loaded, transported by a standard intermodal shipping network, and unloaded using methods and apparatuses disclosed herein. Each module 104 represents a unit of construction that can be used to construct a floor, roof, ceiling, or wall of a wood frame building structure. Each module 104 includes a module length axis 110, a module width 112, a bounded wood perimeter 114, and joists or rafters 118 oriented perpendicularly to the length axis 110. The modules are used together to build and assemble a wood frame building structure. Bounded wood perimeter 114 includes end boards 120 and top and bottom boards 122. End boards 120 and top and bottom boards 122 collectively establish perimetric bounds of all modules 104. Modules 104 are fabricated to have identical dimensions including length 130 and width 112, and are identical in spacing apart of joists or rafters 118. The modules 104, whether they be for floor, roof, ceiling, or wall construction, are produced by way of a similar manufacturing methodology. Wooden modules 104 can be dimensioned to have a length 130 of 5.0, 5.5, 6.0, 6.5, 7.0, 7.5, 8.0, 8.5, 9.0, 9.5, 10.0, 11.0, 12.0, 13.0, 14.0, or 15.0 feet or longer, and a width 112 that represents a portion of the length 130, such as 30%, 35%, 40%, 45%, 50%, 55%, 60%, 65%, or 70% of the length 130 of the wooden modules 104. Modules 104 can have a depth dimension in the range of 0.5 to 3.0 feet, including 1.0, 1.5, 2.0, 2.5 feet. The fabricated wooden modules 104 can be any module disclosed in U.S. Non-Provisional patent application Ser. Nos. 17/394,720 and 17/394,737 which are hereby incorporated by reference in their entireties.

Contemplated in this disclosure are apparatuses that can be used to transport the fabricated rectangular wooden modules. The apparatuses include modified shipping containers that have the fabricated wooden modules loaded within, or such containers in an unloaded state where the modules have been removed. When the containers are loaded with the fabricated rectangular wooden modules, the fabricated rectangular wooden modules are stacked in the interior of the container such that joists or rafters of the fabricated rectangular wooden modules are substantially vertical and the length axes of the modules are substantially parallel to the length axis of the container. By "substantially" vertical or parallel, it is intended that the joists or rafters of the stacked modules may deviate from vertical and their length axes may deviate from parallel by an angle of 10-degrees or less, including 9-degrees or less, 8-degrees or less, 7-degrees or less, 6-degrees or less, 5-degrees or less, 4-degrees or less, 3-degrees or less, 2-degrees or less, and 1-degree or less. The modified shipping containers include a first container opening (front opening) providing access to a container interior from a front of the container and a second container opening (top opening) providing access to the container interior from the top of the container. The first container opening allows loading and/or unloading from the front of the modified shipping container, and the second container opening facilitates loading and/or unloading from the top of the modified shipping container. Also contemplated is a removable header system for modified shipping containers which can facilitate loading and/or unloading of the containers from the front of the containers, particularly for cargo in the container interior having a height reaching or exceeding the header. Also contemplated is a removable cover system for modified shipping containers which can facilitate loading and/or unloading of the containers from the top of the containers and provide for protection of the cargo from rain, sleet, snow, and wind once loaded. When both the header and cover are removed, the first container opening and second container opening together provide for an uninterrupted space spanning through the front and top of the container during loading and unloading. Also contemplated are methods of loading, transporting, and unloading the fabricated wooden modules by way of the modified shipping containers. A method of loading a modified shipping container with fabricated wooden modules can include removing a removable header and/or a removable cover from a modified shipping container, loading one or more fabricated wooden module through the front and/or top of the modified shipping container such that the one or more fabricated wooden modules are stacked vertically with their length axes oriented substantially in parallel to a length axis of the container, and replacing the removable header and/or removable cover to secure and protect the one or more fabricated wooden modules. A method of transporting the fabricated rectangular wooden modules can include transporting the modified shipping container loaded with fabricated wooden modules that are stacked together such that their joists or rafters are substantially vertically oriented and their length axes are substantially parallel to a length axis of the modified shipping container. The wooden modules can be transported by sea, rail, or road. A method of unloading the fabricated wooden modules from a modified shipping container can include removing a removable header and/or removable cover from the modified shipping container and removing one or more fabricated wooden modules through the front and/or top of the modified shipping container. Features of the apparatuses, removable cover system, removable header system, and methods will be made apparent in FIGS. 2-13.

Figure 2:
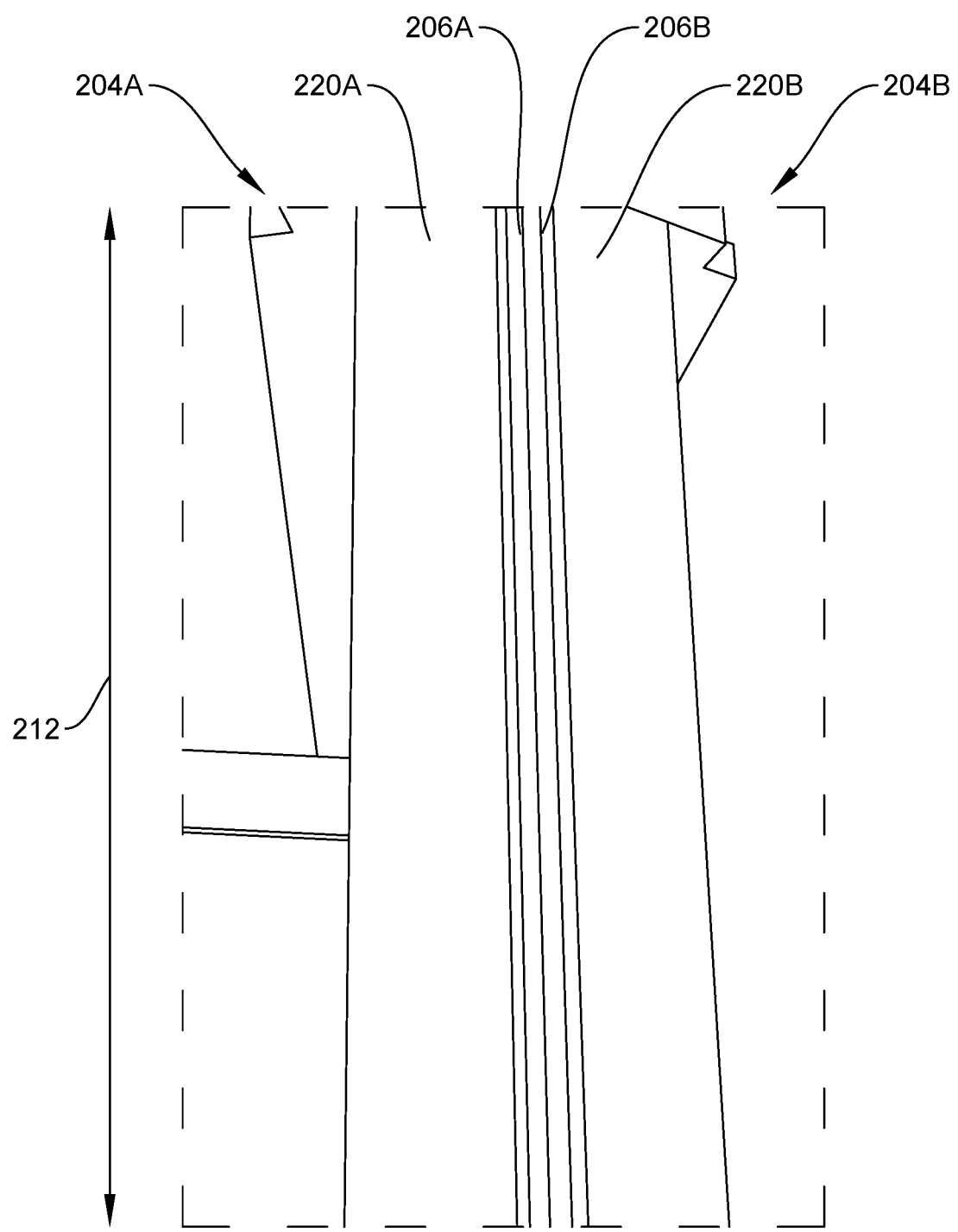
FIGS. 2-5 are images providing a view inside a modified shipping container showing portions of modules stacked together such that the joists and rafters of the modules are oriented substantially vertically within the container interior and the module length axes are parallel to the length of the modified shipping container according to some implementations. The view of the image of FIG. 2 is a side view from the perspective of a viewer at an outside entrance or front opening of the shipping container. The view of the image of FIG. 3 is from the same perspective but is rendered obliquely to show a top inside portion of the modified shipping container, while the views of FIGS. 4-5 are from the same perspective but rendered obliquely to show a bottom inside portion of the modified shipping container.
Figure 3:
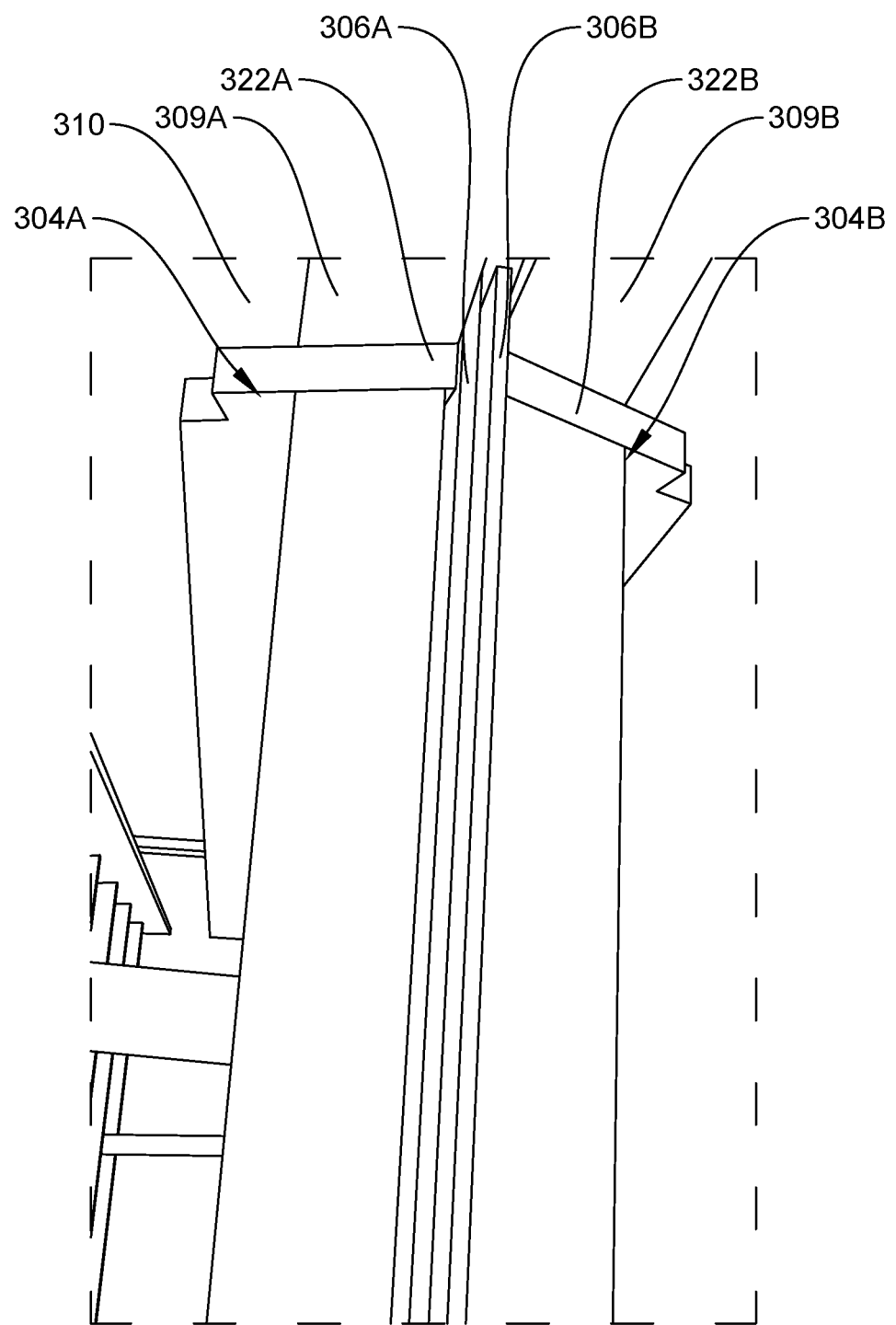
Figure 4:
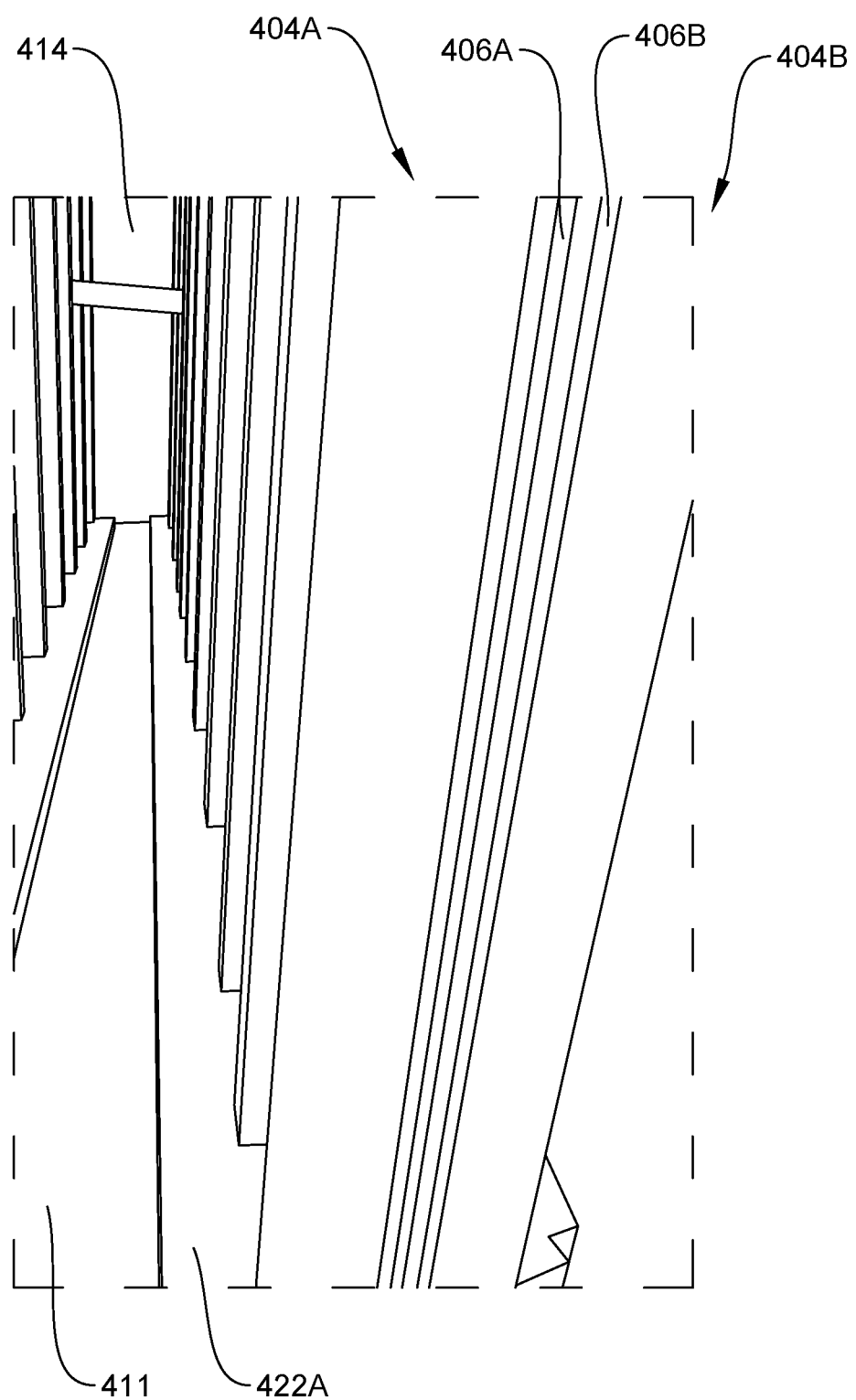
Figure 5:
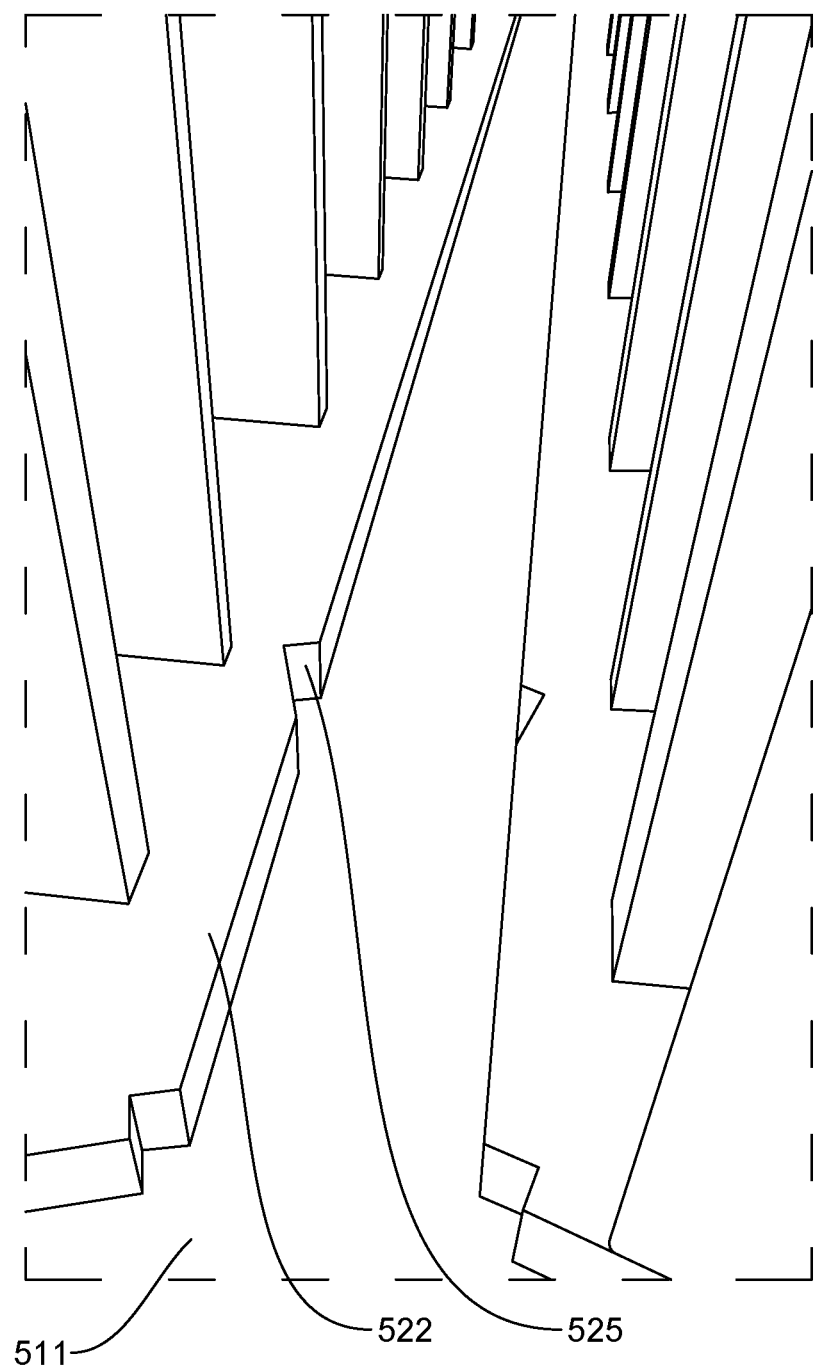

FIG. 2 shows a modified shipping container having two rectangular modules 204A, 204B stacked vertically within the modified container such that their respective end boards 220A, 220B are vertically oriented and face outward toward the modified container front opening. The perspective of FIGS. 2-5 is from the viewer looking inward into the modified container from the modified container front opening. The modules 204A, 204B are oriented in the container such that their module length axes are parallel to each other and transit the container from the front opening to the back of the modified container. Said another way, the perspective of FIGS. 2-5 is of the module length axes (called out as 110 in FIG. 1) penetrating outward and perpendicularly from the plane of the drawing toward the viewer. The module length axes are also perpendicular to the module width axis 212 which spans from the bottom to the top of the modified container. As such, the module widths span a portion of the height of the modified shipping container. The modules 204A, 204B are stacked vertically in this orientation, whether the modules be floor modules, roof modules, ceiling modules, or wall modules. While the figures in this instance show examples of roof modules, other modules used for other portions of the wood framed structure such as floor, ceiling, or wall can be stacked vertically in the same orientation. This orientation advantageously allows multiple modules to be stacked in the container from the front of the container, or, as will be discussed further below, from the top of the container, such that minimal stress is put on the modules during shipping. Modules 204A, 204B are separated by filling timbers 206A, 206B which help keep modules 204A, 204B securely fit in the container and prevent them from knocking or rattling against each other during shipments. FIG. 3 shows that modules 304A, 304B can be kept further secured (in addition to use of filling timbers 306A, 306B) by placing securing timbers 309A, 309B between top boards 322A, 322B of modules 304A, 304B and the container top 310. FIG. 4 shows bottom board 422A of module 404A flush with the plane of the container floor 411. As such, by having modules supported horizontally by top boards 322A, 322B and bottom boards (e.g., 422A) parallel to the container top and bottom, and supported vertically by way of filling timbers 306A, 306B, 406A, 406B between the modules, stress on the modules is greatly minimized during shipping. Container end 414 is shown at the back of the modified container. FIG. 5 is another perspective view showing the bottom board 522 with joint 525 flush with container floor 511.

Figure 6A:
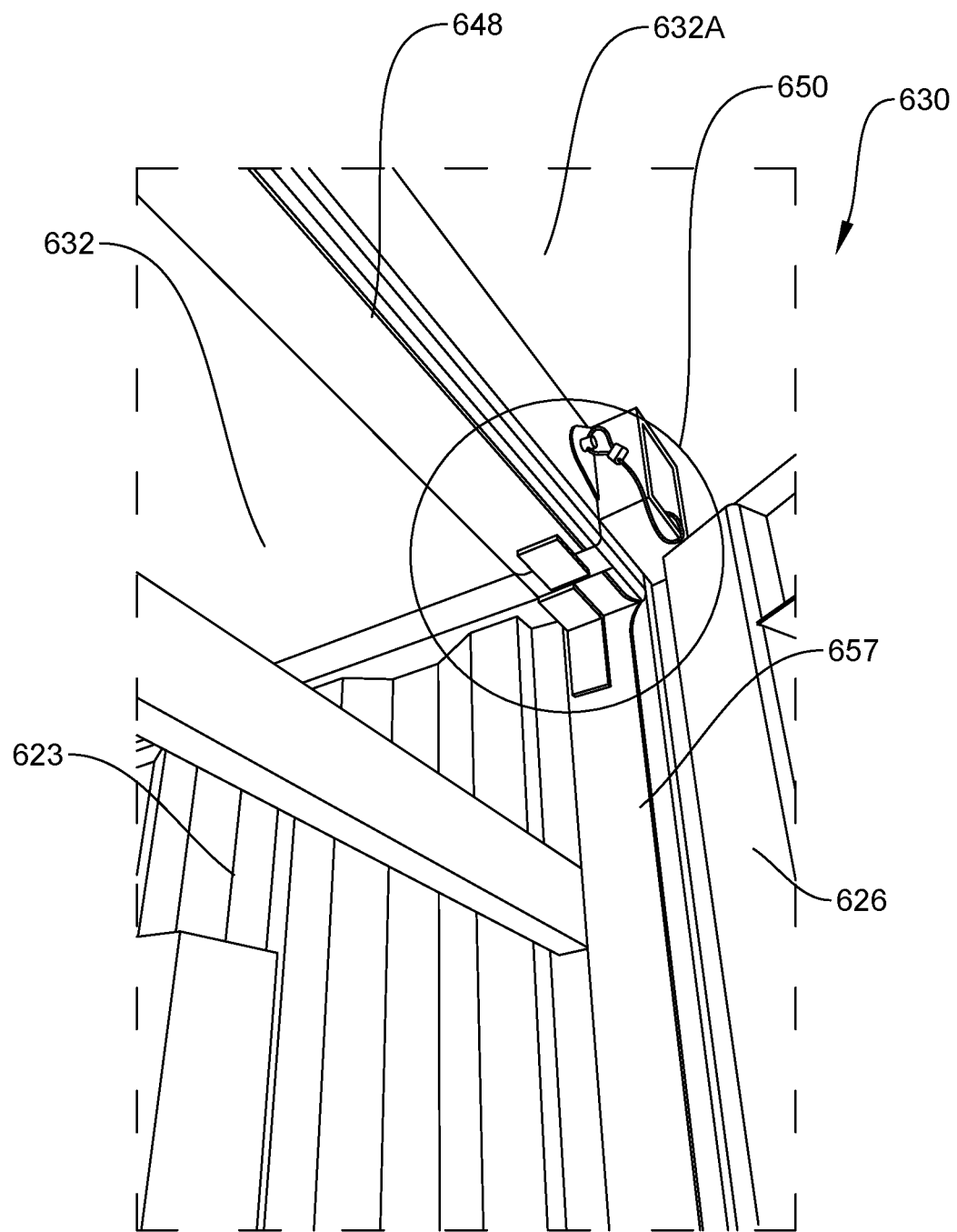
FIGS. 6A-6D feature a removable header system of a modified shipping container according to some implementations, with FIG. 6A an image providing an overview of a portion of a container front opening showing the location of the removable header system.

FIG. 6A provides a perspective view of a portion of a modified container front opening 630. Container door 626 extends outward from container side 623 at a joint providing a hinge for opening and closing container door 626. Removable cover 632 provides a top to the modified container and replaces the conventional metal top of shipping containers. The removable cover 632 at the top of the modified container advantageously allows modules to be loaded and/or unloaded by way of a crane from the opening at the top of the container when the cover is removed. The removable cover 632 can be made of a flexible material such as vinyl or other polymeric material. Also contemplated are other materials which would make the cover suitable for removal, such as thin sheet metal or a rigid plastic connected to container by way of a hinge, straps, or other securing mechanism. A portion 632A of the cover is shown extending over the container front opening 630. As such, the removable cover 632 is dimensioned so that the area of the removable cover exceeds the area bounded by the walls and doors of the container so that portion 632A of cover extends over a top portion of each wall, as will be shown in subsequent figures. The extending portion 632A can represent anywhere from 2% to 20% of the total area of the removable cover 632.

FIG. 6A also shows a removable header 648 and side frame 657 connected together at the container front opening 630. The header 648 can be installed or removed at the top of the front opening 630 of the modified container. Header 648 can be a rectangular piece of a suitable metal or metal alloy and can be dimensioned to have a length spanning a majority of the width of the inside of the modified shipping (e.g., anywhere from 88%, 90%, 92%, 94%, 96%, or 98% of a standard shipping container interior width of 7 feet 8 inches). The removable header can have a width of several inches, such as 5, 6, 7, 8, 9, 10, 11, or 12 inches. Removal of the header 648 allows modules to be loaded through the front opening of the modified container by way of a crane, forklift, or other loading machine while installation of the header 648 provides an additional means of securing the modules once loaded therein. When both the header and cover are removed, a continuous space spans from the front of the container through the top of the container, allowing for both front and top loading or a combination thereof. A removable header system, the general area of which is called out at 650, provides a mechanism for attachment or detachment of the header. When the modified container is loaded with the modules, a serialized identifier for the contents can be included to ensure the contents have not been tampered with.

Figure 6B:
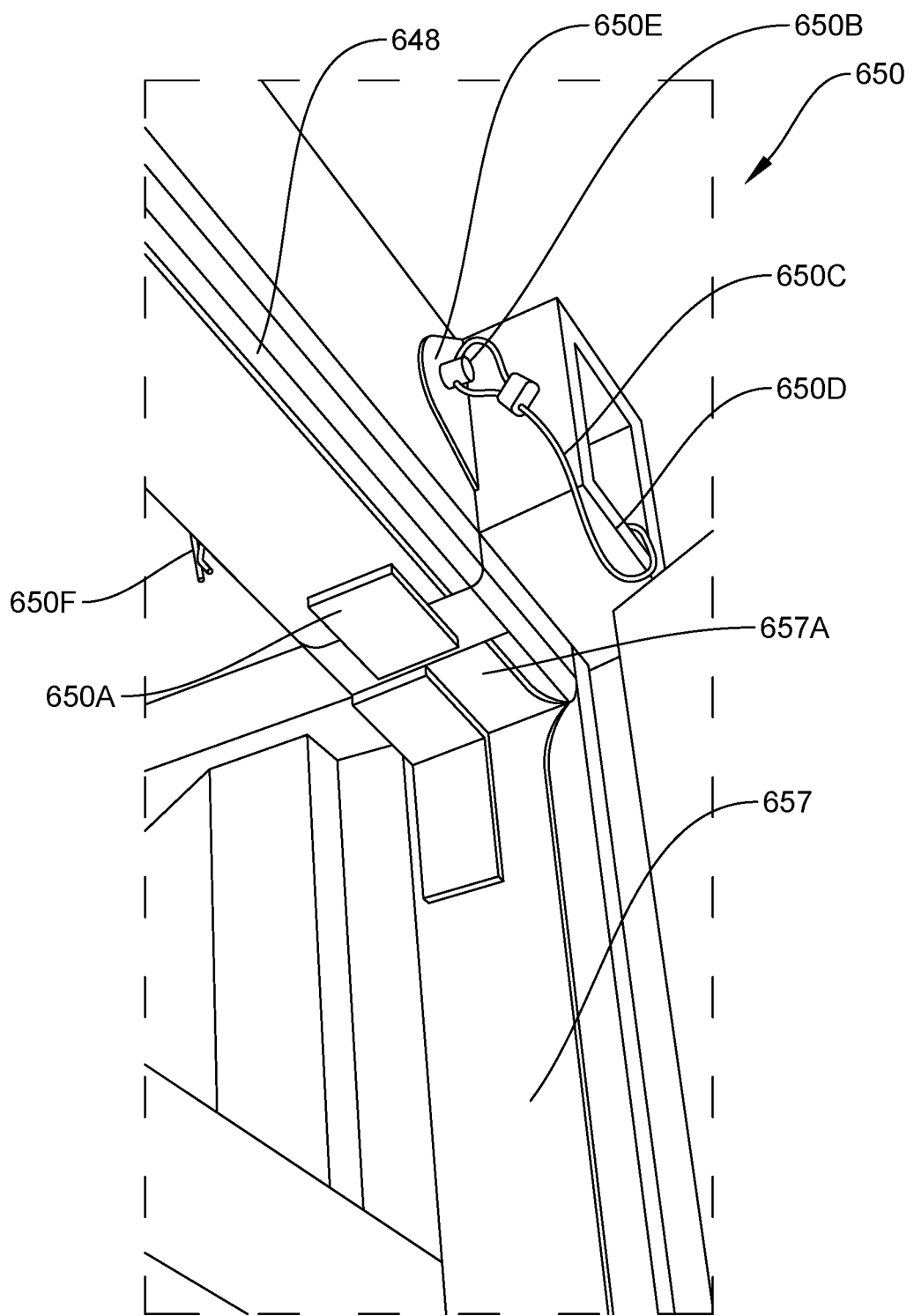

FIG. 6B provides a magnified view of the area of the removable header system 650. A first support structure, an oblong, flat piece of metal or metal alloy shown in FIG. 6B as a tongue 650A is attached to a portion 657A of top of the side frame 657 which turns inward at a 90-degree angle to occupy a portion of the interior width of the container such that portion 657A is coplanar with and abuts end of header 648. The support tongue 650A functions as a platform to help hold the header 648 when inserting or removing locking pin 650B, which secures header 648 in place. The first support structure can be made of metal or metal alloy and be dimensioned rectangularly to have a length slightly exceeding its width, such as a length that is 105%, 110%, 115%, 120%, 125%, 130%, 135%, 140% of its width, where the width of the support tongue can be a portion of the width of the removable header, such as 30%, 35%, 40%, 45%, 50%, 55%, 60%, 65%, or 70% of the width of the removable header 648. However, other shapes and dimensions of the first support structure which provide a platform for supporting the header 648 are possible, including rectilinear (e.g., square, polygon) or curvilinear (e.g., circular, oval) shapes. The support tongue 650A can be attached to side frame portion 657A through welding or by any suitable fastener.

Figure 6C:
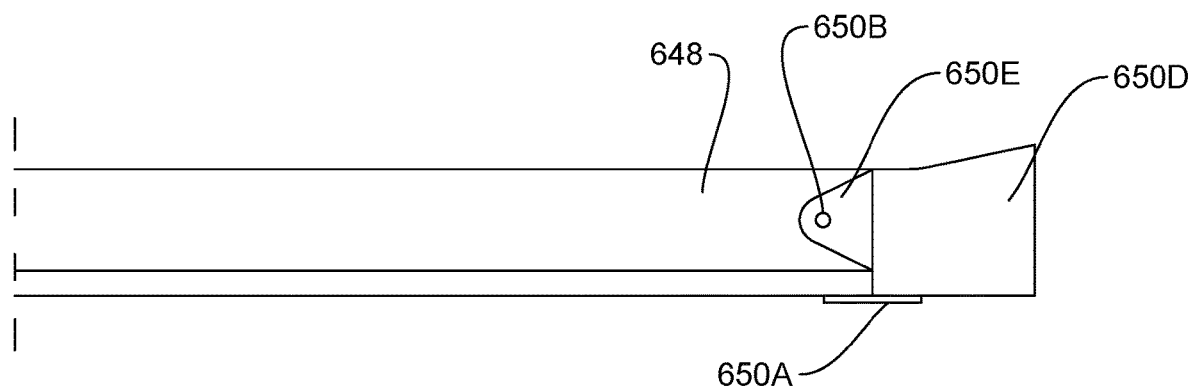
Figure 6D:
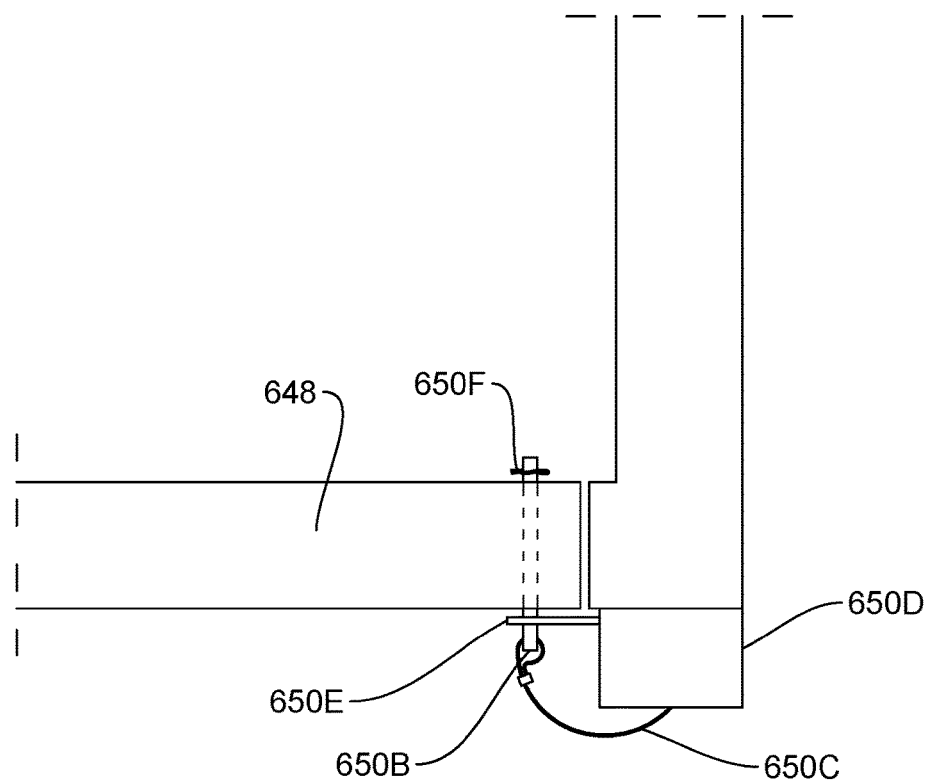

Locking pin 650B is shown secured to modified container by locking pin tether 650C to prevent misplacement or loss, which tether can be a metal or metallic wire of a diameter that resists breakage. Locking pin 650B can have a length slightly longer than the width of header 648, such as 105%, 110%, 155%, 120% the width of the header 648, and can have a diameter designed to fit securely into a bore of the header 648. One end of tether 650C is attached to a second support structure, shown as a metal block 650D, by welding while an opposing end of the tether 650C has a loop attached to locking pin 650B through a hole at a head of the locking pin 650B. The second support structure 650D can be composed of metal or metal alloy and is attached to the container at an outer facing surface of side frame portion 657A through welding or one or more fastener. The second support structure can have an interior portion which is hollow for attaching end of tether 650C. Support structure 650D also supports a flange 650E which provides a bore for accepting locking pin 650B. Flange 650E can be a flat oblong strip of metal or metal alloy that is welded to support structure 650D such that is aligned parallel to header 648. The bore of flange 650E is in alignment with bore of header 648 and has a similar diameter. Finally, a locking clip 650F on a side of the header 648 opposing the flange 650E secures the locking pin 650B in place and prevents it from being released. FIG. 6C provides a side view of header 648 showing locking pin 650B passing through bore of flange 650E. Tongue header support 650A supports header 648 during locking or unlocking and support structure 650D provides support for flange 650E. FIG. 6D provides a top view which shows length of locking pin 650B passing through bore of flange 650E and bore of header 648 dimensioned to receive locking pin. The locking clip 650F is shown securing locking pin 650B on opposing side of header 648 with respect to flange 650E (i.e., the locking clip 650F is at the back of the header 648 from the perspective of a viewer outside the front opening of the modified container). The roles of the support structure 650D providing a base of attachment of locking pin tether 650C and flange 650E at the front of the header 648 are also shown. An additional removable header system having the aforementioned components at the opposite end of the header 648, not shown, can be used to attach the opposite end of the header to the top of the front opening of the modified container.

Figure 7:
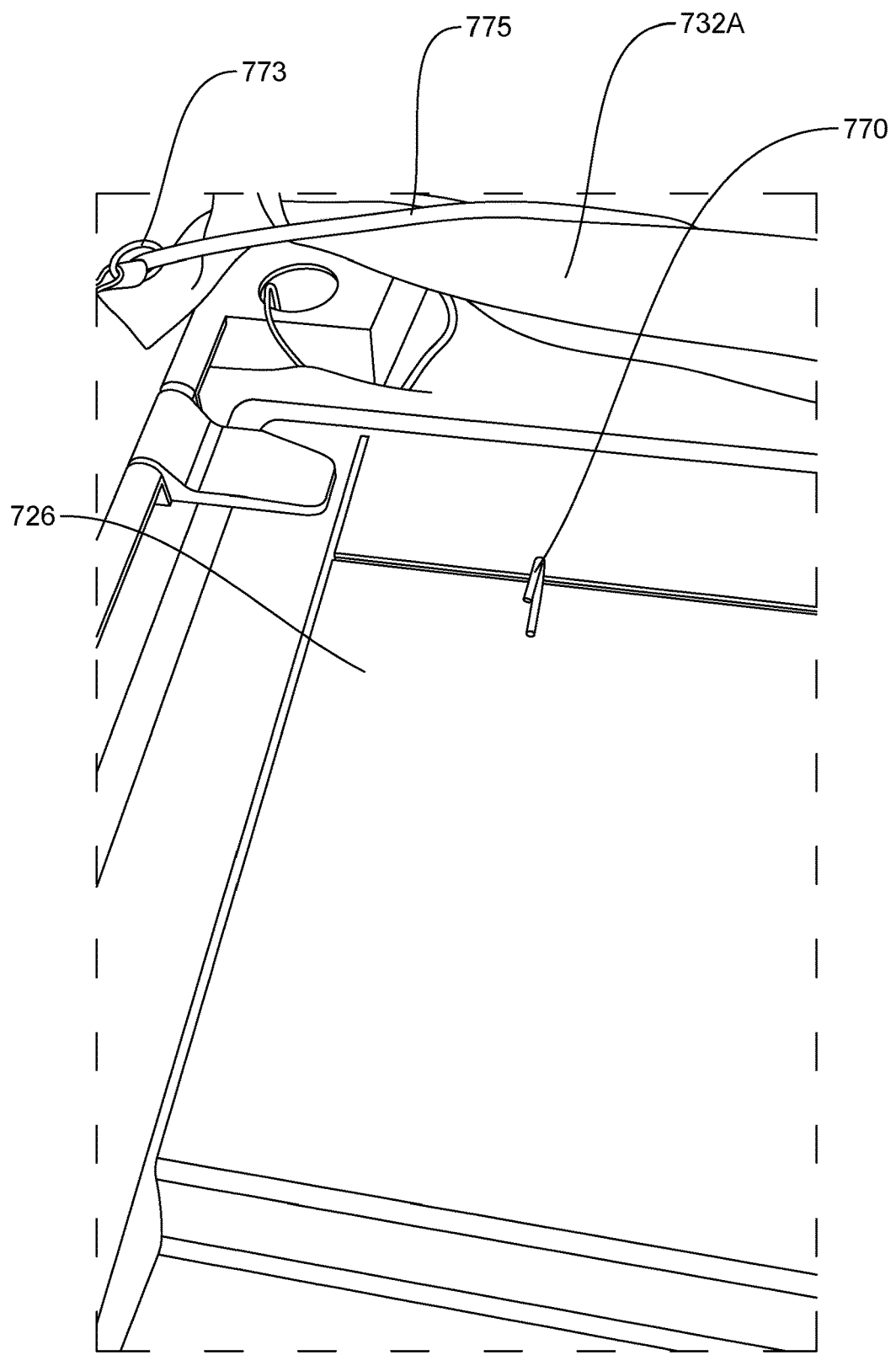
FIGS. 7-13 feature a removable cover system with features for securing a removable cover of the modified shipping container according to some implementations.
Figure 8:
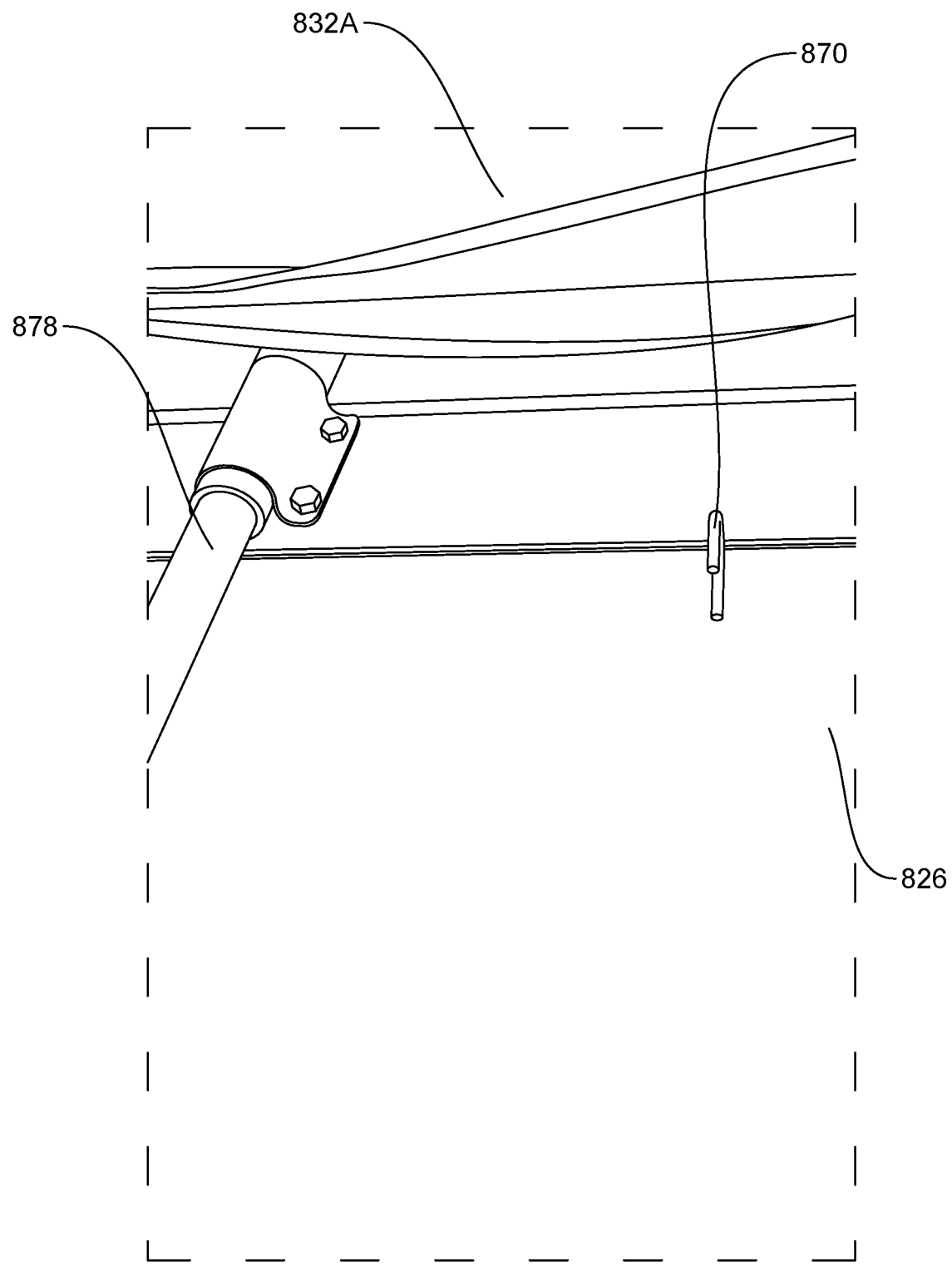
Figure 9:
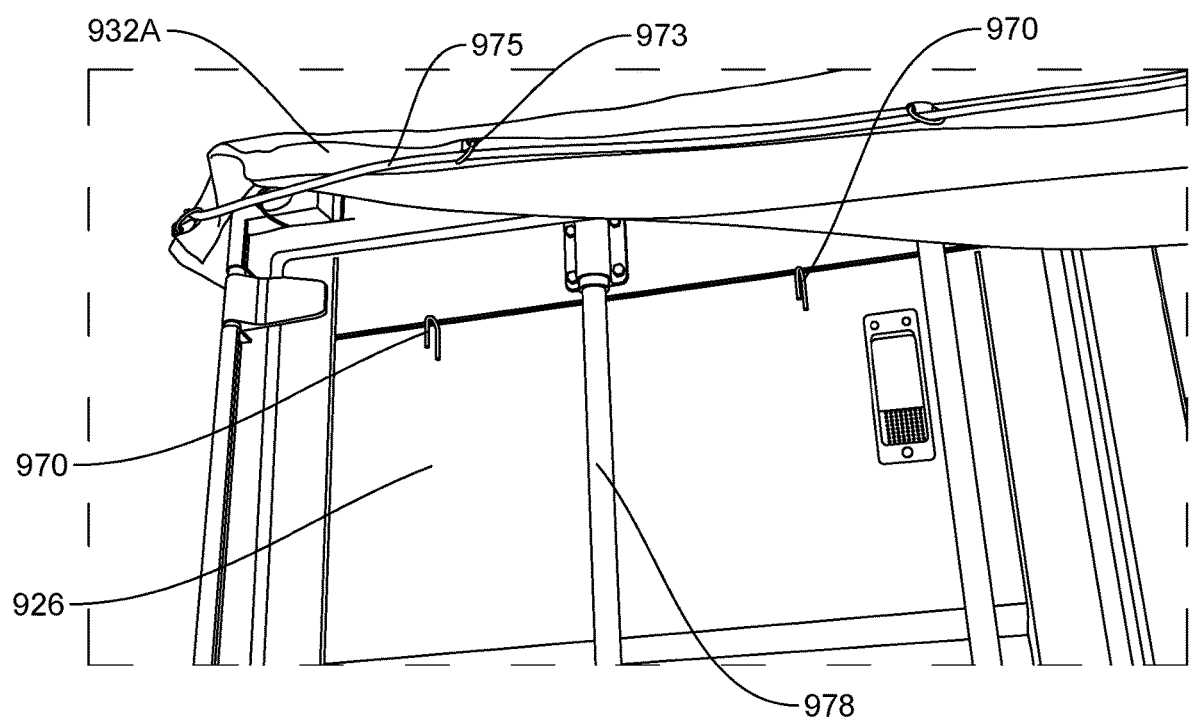
Figure 10:
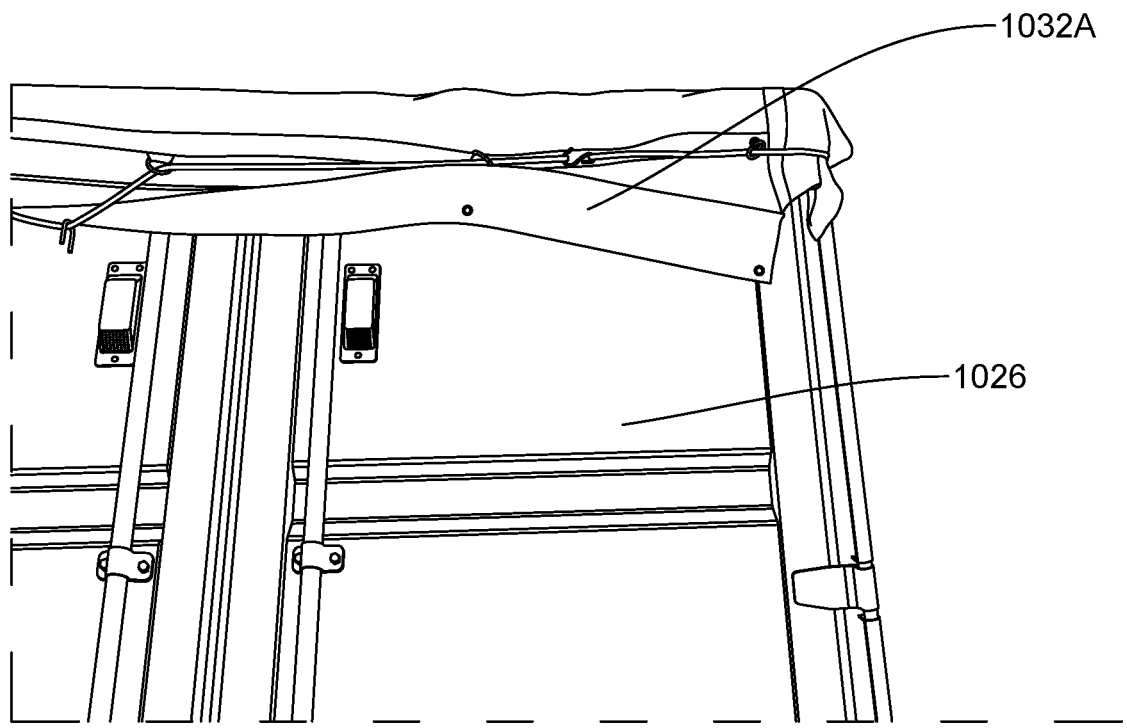
Figure 11:
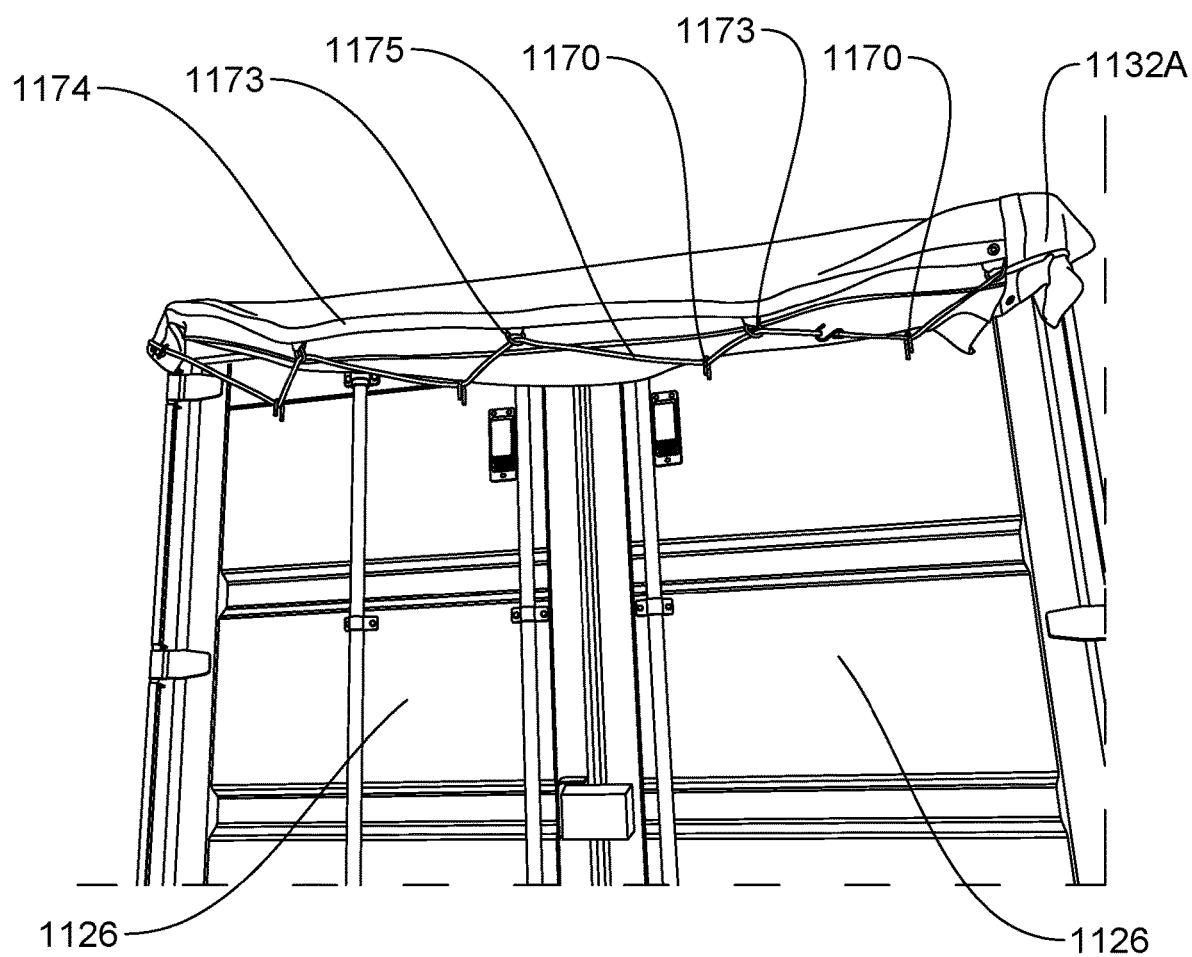
Figure 12:
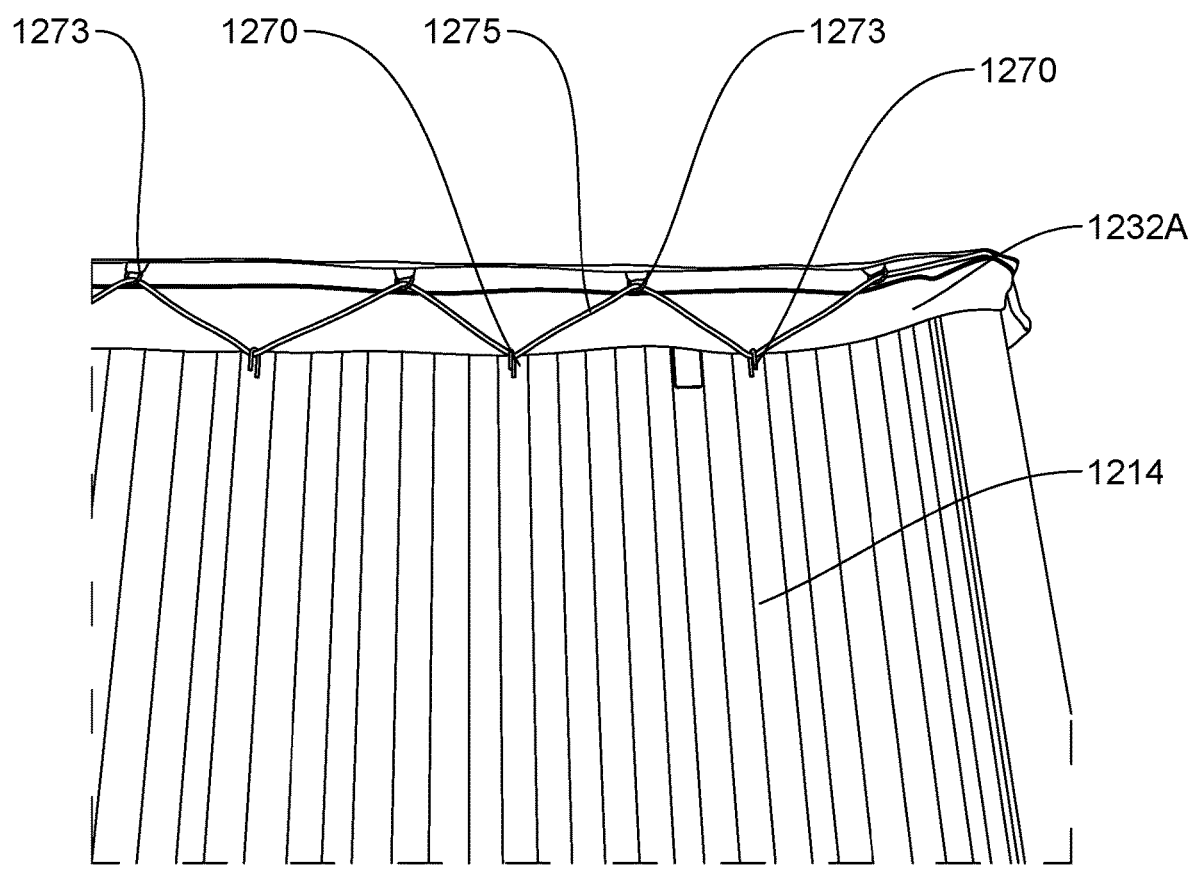
Figure 13:
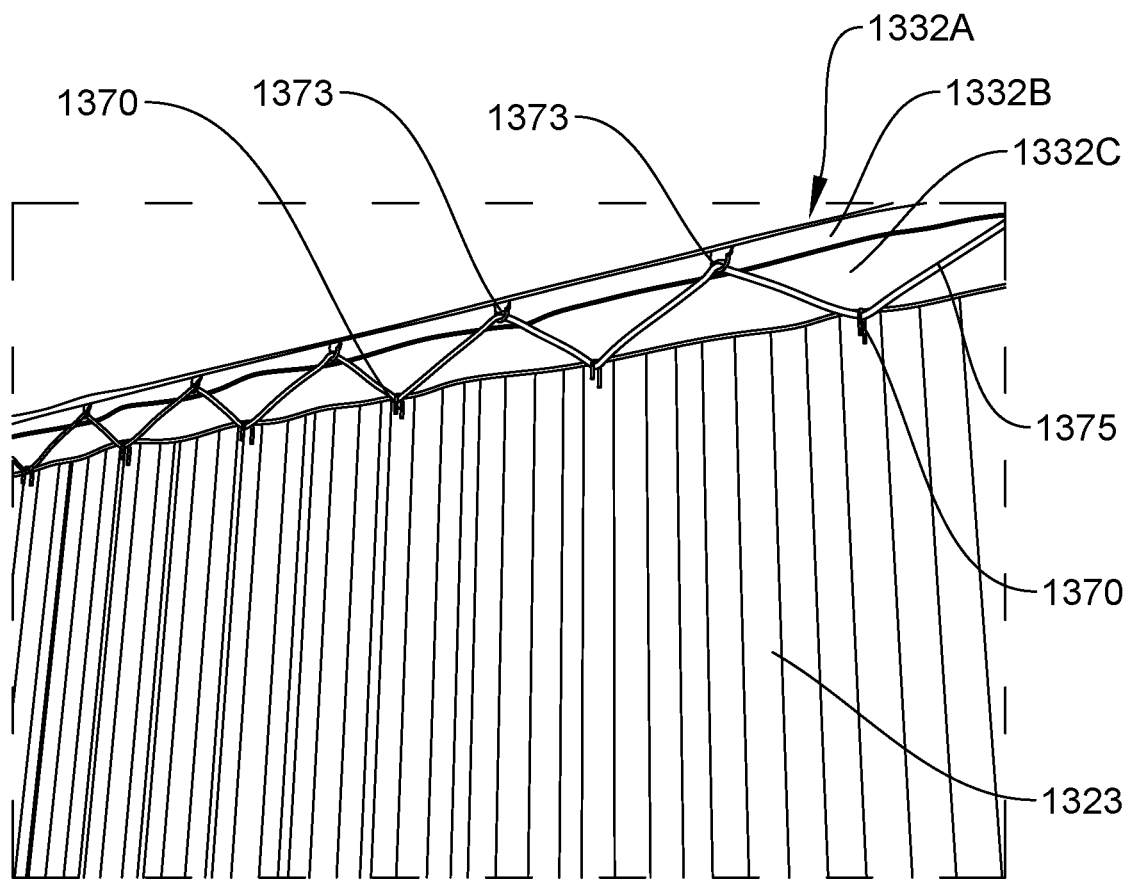

FIGS. 7-13 demonstrate a removable cover system which includes mechanisms for securing the cover of the modified container to the outside of the container doors, sides, and end according to some implementations. FIG. 7 shows container door 726 lying below portion 732A of cover overhanging the top of the modified container. The modified container includes a hook 770 mounted on the container door 726 for securing the cover. A rope 775 threaded through a metallic ring 773 attached to the cover portion 732A can be used to secure the cover as shown in subsequent figures. An additional view of the container door 826 with portion 832A of cover overhanging, as well as hook 870 mounted on container door 826 is shown in FIG. 8, which also features a securing bar 878 for securing the container door 826 when it is in a closed position. A more expanded view featuring container door 926, securing bar 978, portion of cover 932A, with mounted hooks 970, ring 973 attached to cover portion 932A with rope 975 passing therethrough, is shown in FIG. 9. FIG. 10 shows a portion 1032A of the cover that is unsecured to the container door 1026, while FIG. 11 shows the portion 1132A of the cover secured to the top of the container doors 1126 by passing rope 1175 through hooks 1170. Rope 1175 is also shown passing through rings 1173 which are attached to a border, margin, or strip of reinforced material or fabric 1174 disposed toward an outer edge of the cover portion 1132A. Hooks 1170, 1270, 1370 can be mounted on the container door(s), container end, or container sides at regularly spaced intervals, such as 6 inches, 8 inches, 10 inches, 12 inches, 16 inches, or 20 inches, a few inches below the top of the container, such as 6, 7, 8, 9, 10, 11, or 12 inches, as shown in FIGS. 11-13. As such, the combination of regularly spaced hooks 1170, 1270, 1370 and regularly spaced rings 1173, 1273, 1373 placed above and in between hooks allows cover portion 1132A, 1232A, 1332A to be secured flat against top portion of doors 1126, end 1214, or side 1323 of container. FIG. 12 shows a view of the secured cover portion 1232A with respect to a container end 1214, with a portion of the rope 1275 passing through hooks 1270 mounted on container end 1214 and rings 1273 attached to cover portion 1232A. The rope 1175 is seen threaded taut between each hook 1270 and ring 1273 such that it forms a zig-zag pattern between the two to secure the cover tightly over the top of the container end 1214. FIG. 13 similarly shows a container side 1323 with cover portion 1332A secured tightly against the top of the container side 1323 by way of rope 1375 tightly threaded in a zig-zag pattern through hooks 1370 mounted on container side and rings 1373 attached to cover portion 1332A. The cover portion 1332A is shown with two additional margins 1332B, 1332C extending over the top of the modified container to cover the top of the container side 1323.

The modified container provides numerous benefits for shipping the rectangular modules for construction of wood frame building structures. The containers can be used in transport by way of a standard intermodal shipping network (e.g., sea, rail, road), as the modified containers are sized to the same outer dimensions as standard shipping containers (e.g., 8 feet wide by 10, 20, 40, or 45 feet long by 8.5 feet or 9.5 feet tall). This provides for the ability to ship the modules without oversize (i.e., "wide load") permits and the complexity and cost that shipping brings. Moreover, the ability to pick the panels vertically drastically increases job site installation flexibility and shipping density. The removable header allows for easy loading, and the retractable and securable cover provides for a layer of protection against the elements. The modified containers can also be manufactured so that the sides and doors fold and collapse, either outward or inward toward the container bottom, which allows for multiple containers to be returned flat after shipping at a greatly reduced height (e.g., 6 inches tall instead of 9.5 feet tall). The sides and doors can be attached to the bottom of the container by way of a hinge mechanism that can lock the sides and doors upright in place during use or allow them to fold downward and inward over the bottom the container or outward when not in use.

It should be noted at this point that orientational terms such as horizontally, vertically, top, bottom, front, end, and sides refer to the subject drawings as viewed by an observer. The drawing figures depict their subject matter in orientations of normal use. Therefore, orientational terms must be understood to provide semantic basis for purposes of description, and do not limit the invention set forth in the claims in any particular way.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method of loading one or more fabricated rectangular wooden modules into a modified shipping container having an interior and top, each fabricated rectangular wooden module comprising a module length axis, a module width axis, a bounded wood perimeter, and joists or rafters oriented perpendicularly to the module length axis, the method comprising placing the one or more fabricated rectangular wooden modules in the interior of the modified shipping container such that joists or rafters of the fabricated rectangular wooden modules are substantially vertical and the length axes of the modules are substantially parallel to a length axis of the container; and removing a removable header from the modified shipping container prior to placing the one or more fabricated rectangular wooden modules in the interior of the modified shipping container, wherein the removable header is a component of a system installed on the modified shipping container, the system comprising
 a frame having a structure extending outward from the frame and capable of supporting the header;
 a flange attached to a support, the flange having a flange bore therethrough and in alignment with a header bore;
 a pin designed to pass through the header bore and the flange bore; and
 a clip designed to attach at an end of the pin on a side of the header opposing the flange which locks the pin in place when the header is attached to the modified shipping container.

2. The method of claim 1, wherein the one or more fabricated wooden modules are placed in the interior of the modified shipping container through a front opening of the modified shipping container.

3. The method of claim 2, further comprising replacing the removable header after the one or more fabricated rectangular wooden modules are placed in the interior of the modified shipping container interior.

4. The method of claim 1, further comprising removing a removable cover from the modified shipping container prior to placing the one or more fabricated rectangular wooden modules in the interior of the modified shipping container.

5. The method of claim 4, wherein the one or more fabricated wooden modules are placed in the interior of the modified shipping container through a top opening of the modified shipping container.

6. The method of claim 5, further comprising replacing the removable cover after the one or more fabricated rectangular wooden modules are placed in the interior of the modified shipping container interior.

7. The method of claim 4, wherein the removable cover comprises:
 a rectangular piece of flexible polymeric material dimensioned to cover the top of the modified shipping container, the flexible polymeric material comprising a portion which extends over a top portion of one or more sides of the shipping container during use,
 a strip or margin of material attached to the portion of polymeric material; and
 a plurality of rings attached to the strip or margin of material.

8. A method of unloading one or more fabricated rectangular wooden modules into a modified shipping container having an interior and top, each fabricated rectangular wooden module comprising a module length axis, a module width axis, a bounded wood perimeter, and joists or rafters oriented perpendicularly to the module length axis, the method comprising removing the one or more fabricated rectangular wooden modules from the interior of the modified shipping container, the fabricated rectangular wooden modules having been previously loaded such that they are oriented within an interior of the modified shipping container such that joists or rafters of the fabricated rectangular wooden modules are substantially vertical and the length axes of the modules are substantially parallel to a length axis of the container; and removing a removable header from the modified shipping container prior to placing the one or more fabricated rectangular wooden modules in the interior of the modified shipping container, wherein the removable header is a component of a system installed on the modified shipping container, the system comprising
 a frame having a structure extending outward from the frame and capable of supporting the header;
 a flange attached to a support, the flange having a flange bore therethrough and in alignment with a header bore;
 a pin designed to pass through the header bore and the flange bore; and
 a clip designed to attach at an end of the pin on a side of the header opposing the flange which locks the pin in place when the header is attached to the modified shipping container.

9. The method of claim 8, wherein the one or more fabricated wooden modules are removed from the interior of the modified shipping container through a front opening of the modified shipping container.

10. The method of claim 8, further comprising removing a removable cover from the modified shipping container prior to removing the one or more fabricated rectangular wooden modules from the interior of the modified shipping container.

11. The method of claim 10, wherein the one or more fabricated wooden modules are removed from the interior of the modified shipping container through a top opening of the modified shipping container.

12. The method of claim 10, wherein the removable cover comprises:
 a rectangular piece of flexible polymeric material dimensioned to cover the top of the shipping container, the flexible polymeric material comprising a portion which extends over a top portion of one or more sides of the shipping container during use,
a strip or margin of material attached to the portion of polymeric material; and
a plurality of rings attached to the strip or margin of fabric.

* * * * *